United States Patent
Kim

(10) Patent No.: US 7,686,114 B2
(45) Date of Patent: Mar. 30, 2010

(54) TRAVELING OUTDOOR HEALTH MACHINE AND THE CONTROL METHOD

(76) Inventor: Ik Nyun Kim, #106-903, Hyundai Apt., Eungbong-dong, Seongdong-gu, Seoul (KR) 133-070

( * ) Notice: Subject to any disclaimer, the term of this patent is extended or adjusted under 35 U.S.C. 154(b) by 85 days.

(21) Appl. No.: 11/915,535

(22) PCT Filed: Oct. 19, 2005

(86) PCT No.: PCT/KR2005/003487

§ 371 (c)(1),
(2), (4) Date: Nov. 26, 2007

(87) PCT Pub. No.: WO2006/043781

PCT Pub. Date: Apr. 27, 2006

(65) Prior Publication Data

US 2009/0008897 A1    Jan. 8, 2009

(30) Foreign Application Priority Data

Oct. 21, 2004   (KR)   .................. 10-2004-0084302

(51) Int. Cl.
*B62K 11/00* (2006.01)
(52) U.S. Cl. .................. 180/205; 180/206; 180/207; 180/210
(58) Field of Classification Search .................. 180/205, 180/206, 207, 210, 216
See application file for complete search history.

(56) References Cited

U.S. PATENT DOCUMENTS

| | | | | |
|---|---|---|---|---|
| 3,485,510 A | * | 12/1969 | Merlan | ...................... 280/250 |
| 4,746,135 A | * | 5/1988 | Oh | .............................. 280/262 |
| 5,368,321 A | * | 11/1994 | Berman et al. | ............... 280/221 |
| 5,501,476 A | * | 3/1996 | Howell et al. | ................ 280/230 |
| 6,070,894 A | * | 6/2000 | Augspurger | ................. 280/249 |
| 6,173,981 B1 | * | 1/2001 | Coleman | ..................... 280/253 |
| 6,402,173 B1 | * | 6/2002 | Chiu | ........................... 280/252 |
| 6,669,222 B1 | * | 12/2003 | Barrett et al. | ............. 280/304.1 |
| 7,111,860 B1 | * | 9/2006 | Grimaldos | ................... 280/253 |
| 7,195,583 B2 | * | 3/2007 | Leib | ............................ 482/52 |

* cited by examiner

*Primary Examiner*—Toan C To
(74) *Attorney, Agent, or Firm*—Hamre, Schumann, Mueller & Larson, P.C.

(57) ABSTRACT

Disclosed herein is an outdoor mobile fitness machine. The outdoor mobile fitness machine of the present invention includes a main frame (110), to which a front wheel (12), a rear wheel (130) that is a drive wheel, and a set of handlebars (140) are mounted. The outdoor mobile fitness machine is moved by rotation of the drive wheel, which is rotated by an electromotor (160). The outdoor mobile fitness machine further comprises a fitness device, which is provided on the main frame (110) and operated by feet of a user; a sensor (195), which determines if the fitness device is in operation and detects an operating speed of the fitness device; and a controller (200), which determines both whether the fitness device is in operation and an operating speed of the fitness device and variably controls an electric current to be applied to the electromotor (160), thus automatically controlling motion and moving speed of the fitness machine.

13 Claims, 3 Drawing Sheets

TRAVELING OUTDOOR HEALTH MACHINE AND THE CONTROL METHOD

TECHNICAL FIELD

The present invention relates, in general, to fitness machines and, more particularly, to an outdoor mobile health machine which is manufactured by combining a stepper or stationary fitness bicycle, which are kinds of indoor exercising devices, with a mobile device which is used as a means for moving it outdoors, thus making it possible for a user to conduct exercise that has been executed mainly indoors, outdoors, while in motion, and a control method therefor.

BACKGROUND ART

Generally, according to improvement in living standards, the public's interest in health has increased, so that indoor exercises are gaining popularity. Hence, various indoor exercising devices have been developed and used.

A stepper and a stationary fitness bicycle are representative of indoor exercising devices. The stepper and the stationary fitness bicycle are exercising devices which develop muscles of the lower part of the body and the cardiopulmonary system of a user.

The stepper includes a plurality of footboards, each of which is hinged to a frame, and a hydraulic cylinder, which is mounted to a lower surface of each footboard. Therefore, when the user alternately steps the footboards, the hydraulic cylinders are operated, thus exercising and training the lower parts of the body. In other words, the stepper has a function and effect similar to climbing stairs. Meanwhile, in the stationary fitness bicycle, when the user pedals, internal magnetic resistance provides a load to the user.

For modern people who desire to use vehicles despite traveling relatively short distances, the stepper and the stationary fitness bicycle are exercising devices suitable for developing the lower parts of their bodies and improving their cardiopulmonary systems. However, because they merely allow a user to exercise alone while indoors, the user may become easily bored, soon losing interest. Furthermore, there have been frequent occasions in which modern people, who attach importance to spending time with members of their family, are unable to conduct exercise.

DISCLOSURE OF INVENTION

Technical Problem

Accordingly, an object of the present invention is to provide a mobile fitness machine which is manufactured by combining a stepper or stationary fitness bicycle, which are kinds of indoor exercising devices, with a device which is used as a means for moving it outdoors, thus making it possible for a user to conduct exercise that has been executed mainly indoors, outdoors, while in motion, and a control method therefor.

Another object of the present invention is to provide a mobile fitness machine in which, when the mobile fitness machine is set to a fitness mode, the mobile fitness machine travels by operation of the stepper or the fitness bicycle, and moving speed of the fitness machine is changed according to a speed at which it is operated, thus attracting the interest of people wanting exercise, and a control method therefor.

Technical Solution

An outdoor mobile fitness machine according to an embodiment of the present invention to accomplish the above-mentioned objects, including: a main frame (110), to which a front wheel (120) that is a steerable wheel, a rear wheel (130) that is a drive wheel, and a set of handlebars (140) are mounted, the outdoor mobile fitness machine being moved by rotation of the drive wheel which is rotated by an electromotor (160). The outdoor mobile fitness machine further includes: a fitness device, such as a stepper or a stationary fitness bicycle, provided at an intermediate position on the main frame and operated by feet of a user, the fitness device providing a load, which is a physical resistance against the movement of the feet of the user; a sensor to determine whether the fitness device is in operation and detect an operating speed of the fitness device; and a controller to determine both whether the fitness device is in operation and an operating speed of the fitness device in response to a fitness device information signal transmitted from the sensor and to output a control signal to variably control an electric current to be applied to the electromotor, thus automatically controlling motion and moving speed of the fitness machine.

An outdoor mobile fitness machine according to another embodiment of the present invention to accomplish the above-mentioned objects, including: a main frame (110), to which a front wheel (120) that is a steerable wheel, a rear wheel (130) that is a drive wheel, and a set of handlebars (140) are mounted, the outdoor mobile fitness machine being moved by rotation of the drive wheel which is rotated by an electromotor (160). The outdoor mobile fitness machine further includes: a stepper (180) hinged at an end thereof to a first subsidiary frame (171) coupled to an intermediate position of the main frame (110) and allowing a user to execute an alternately upward and downward stepping exercise using his/her feet; a hydraulic cylinder (190) hinged both to a lower end of the stepper (140) and to a second subsidiary frame (175) coupled to the main frame (110) and operated by upward and downward movement of the stepper (180), thus providing a load to the user; a hydraulic pressure sensor (195) to detect both variation in pressure of the hydraulic cylinder (190) and a rate of pressure variation and to output a signal; and a controller (200) to determine both the pressure variation and the rate of pressure variation in response to the signal output from the hydraulic pressure sensor (195) and to control operation and revolutions of the electromotor (160), thus variably controlling motion and moving speed of the fitness machine.

In detail, the outdoor mobile fitness machine further includes: a fitness mode switch (143) provided on the handlebars (140) to input a command signal to control the operation and the revolutions of the electromotor (160) according to the pressure variation of the hydraulic cylinder (190). When the fitness mode switch (143) is manipulated to select a fitness mode, the controller (200) variably controls the revolutions of the electromotor (160) depending on an upward and downward movement speed of the stepper (180).

A control method of a outdoor mobile fitness machine having a fitness device according to an embodiment of the present invention to accomplish the above-mentioned objects, including steps of: determining whether an operating mode selected by a user is a fitness mode; determining whether the fitness device is in operation using a sensor when the fitness mode is selected; operating an electromotor to rotate a drive wheel of the fitness machine when the fitness device is in operation; determining whether an operating speed of the fitness device is varied while the drive wheel is rotated; and proportionally controlling revolutions of the electromotor depending on the operating speed of the fitness device when the operating speed is varied, thus controlling a moving speed of the fitness machine.

A control method of a outdoor mobile fitness machine having a stepper (180) according to another embodiment of the present invention to accomplish the above-mentioned objects, including steps of: a first step of determining whether an operating mode selected by a user is a fitness mode; a second step of determining whether pressure of a hydraulic cylinder (190) coupled to the stepper (180) is varied using a hydraulic pressure sensor (195) when the fitness mode is selected; a third step of operating an electromotor (160) to rotate a drive wheel when pressure variation is detected; a fourth step of determining whether a rate of pressure variation of the hydraulic cylinder (190) is varied depending on a speed of stepping on the stepper (180) while the drive wheel is rotated; and a fifth step of proportionally controlling revolutions of the electromotor (160) depending on the rate of pressure variation when the rate of pressure variation is varied, thus controlling a moving speed of the fitness machine.

In detail, at the first step, when the fitness mode is not selected, operation of the electromotor (160), which rotates the drive wheel, is controlled depending on an operating mode of a driving control panel (141) located on handlebars (140). At the second step, when pressure of the hydraulic cylinder (190) coupled to the stepper (180) is constant, the electromotor (160) is turned off. At the fourth step, when the rate of pressure variation increases, the revolutions of the electromotor (160) are increased, and, when the rate of pressure variation decreases, the revolutions of the electromotor (160) are reduced.

Furthermore, preferably, when a brake is operated while the fitness machine is in motion, the drive wheel is stopped and the electromotor (160) is turned off, and, when the brake is released, the operation of the electromotor (160) is resumed.

DESCRIPTION OF THE ELEMENTS IN THE DRAWING

Figure 1:
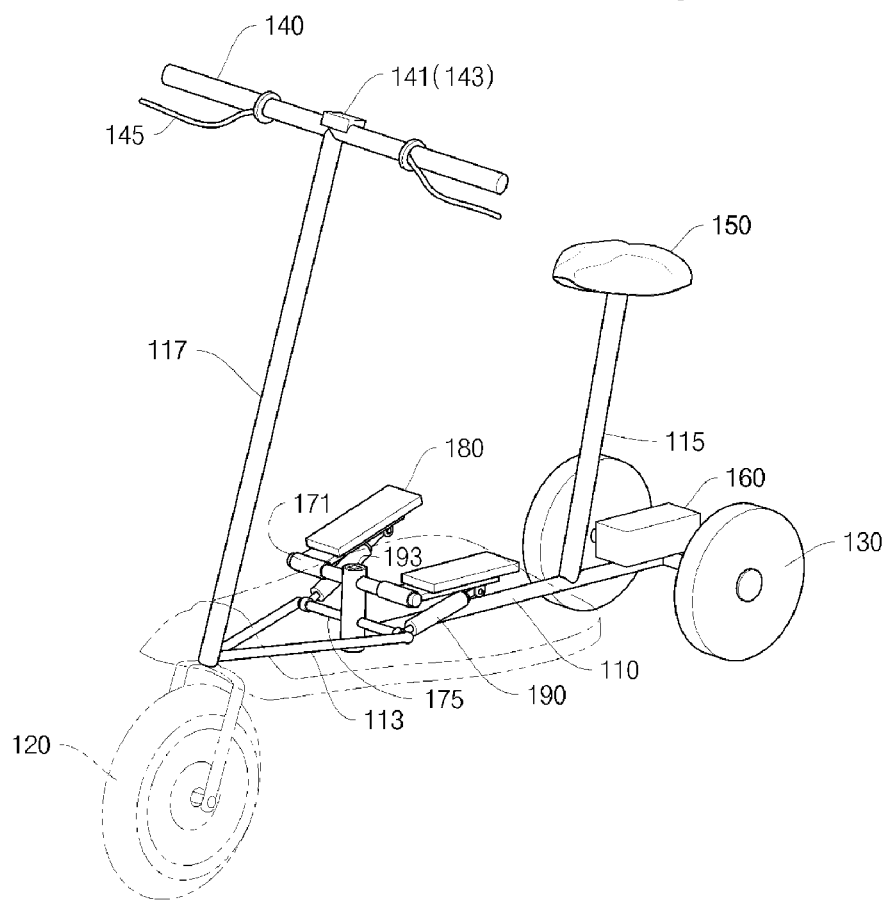
FIG. 1 is a view showing a mobile fitness machine having a stepper, according to the present invention.

110: main frame 113: front frame
115: variable frame 117: handlebar frame
120: front wheel 130: rear wheel
140: handlebars 141: driving control panel
143: fitness mode switch 145: brake lever
150: seat 160: battery and electromotor
171, 175: first and second subsidiary frames 180: stepper
190: hydraulic cylinder 193: pressure control valve
195: hydraulic pressure sensor 200: controller

BEST MODE FOR CARRYING OUT THE INVENTION

Hereinafter, the present invention will be described in detail with reference to the attached drawings.

Figure 2:
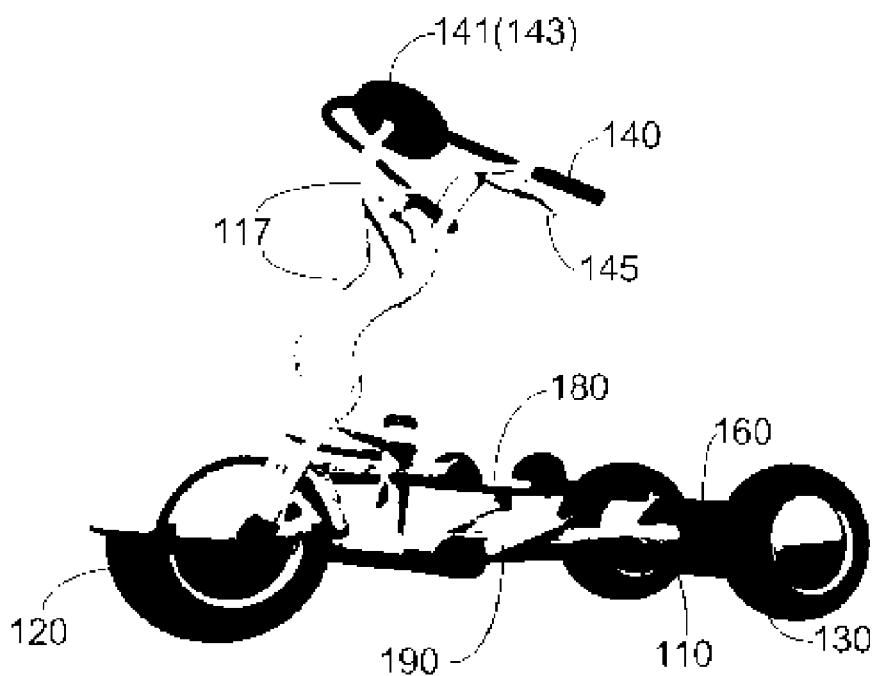
FIG. 2 is a view showing a mobile fitness machine having a stepper, according to an embodiment of the present invention.
Figure 3:
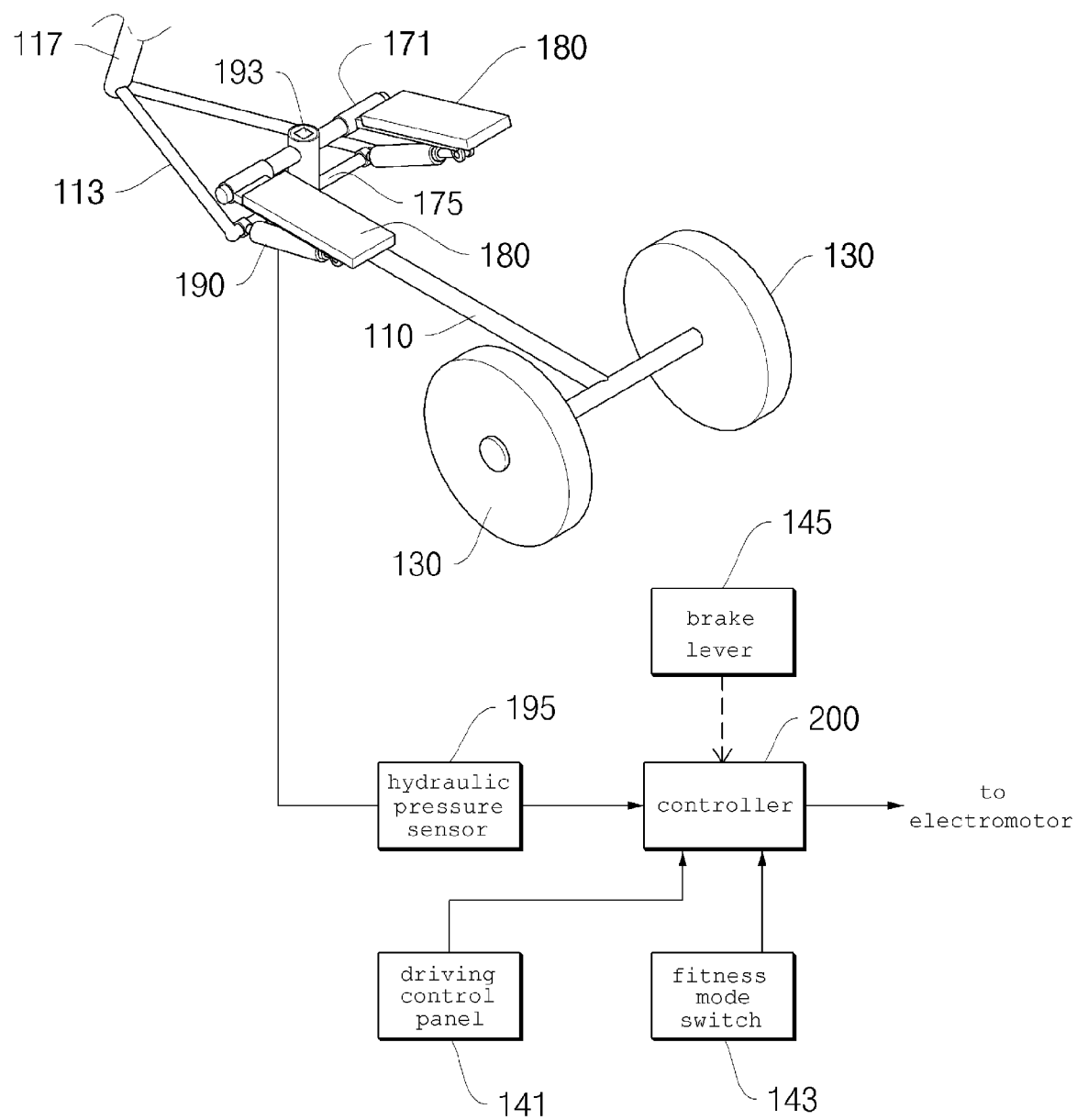
FIG. 3 is a view showing a control unit of the mobile fitness machine having the stepper, according to the embodiment of the present invention.

FIG. 1 is a view schematically showing a mobile fitness machine having a stepper, according to the present invention. FIG. 2 is a view showing a mobile fitness machine having a stepper, according to an embodiment of the present invention. FIG. 3 is a view showing a control unit of the mobile fitness machine having the stepper, according to the embodiment of the present invention. The mobile fitness machine includes a main frame 110, a front wheel 120, rear wheels 130, handlebars 140, an electromotor 160, a stepper 180, a hydraulic cylinder 190 and a controller 200.

The present invention has a structure such that the mobile fitness machine and the stepper can be organically connected to each other. The present invention includes the basic constructions of both the mobile fitness machine and the stepper.

In detail, the front wheel 120, which is a steerable wheel, is coupled at a front position to the main frame 110. The rear wheels 130, which are drive wheels, are coupled rear positions to the main frame 110. In this embodiment, in consideration of fitness purposes and stability, the fitness machine has a three-wheeled structure. Furthermore, the fitness machine having the three-wheeled structure will be mainly explained, but the present invention is not limited to this. According to the circumstances, the present invention may be embodied as a two-wheeled fitness machine and a four-wheeled fitness machine.

The handlebars 140, which control the front wheel 120, are provided above the front wheel 120 in the front of the main frame 110. A seat 150 is provided on the main frame 110, at a position between a medial portion and a rear portion, in order to support a user in a sitting position. A battery and the electromotor (160; DC motor), which can operate the drive wheels to move the fitness machine, are provided at predetermined positions on the main frame 110.

Furthermore, a driving control panel 141, which allows the user to control operation of the electromotor 160 and the number of revolutions thereof, is provided on the handlebars 140. As well, a fitness mode switch 143, which sets such that the electromotor 160 is operated in conjunction with the operation of the stepper 180, and brake levers 145, which brake the front wheel 120 and the rear wheels 130, are provided on the handlebars 140.

The stepper 180 has footboards, each of which is hinged at an end thereof to a first subsidiary frame 171 mounted at a medial position of the main frame 110. Thus, the stepper 180 allows the user to alternately step on the footboards using his/her feet in upward and downward directions. The stepper 180 further has hydraulic cylinders 190, which are hinged to the footboards and a second subsidiary frame 175 coupled to the main frame 110, so that the hydraulic cylinders 190 are operated by vertical movement of the footboards and provide a load to the user.

The brake levers 145, which are provided on the handlebars 140, constitute a brake system. Furthermore, a typical disk brake or band brake (not shown) may be selectively provided on each of the front wheel 120 and the rear wheels 130.

As well, it is preferable that a wheel locking device (not shown) be provided on the rear wheels 130 such that the user can exercise using the stepper 180 in a stationary state, not only outdoors but also indoors.

The seat 150, which supports a user in a sitting position, is mounted to an upper end of a typical variable frame 115. The variable frame 115 is securely coupled to the main frame 110 in an approximately reversed Y shape. Furthermore, the variable frame 115 is adjustable in height depending on the physical characteristics of the user.

In the case that the fitness machine is in a fitness mode, that is, in the case that the user uses the stepper 180, the user typically steps on the stepper 180 in a standing position, but not while sitting on the seat 150. Therefore, the seat 150 may be excluded from the fitness machine, as shown in FIG. 2. If the fitness machine has no seat, the user must use it in a standing position, but not while in a sitting position.

The stepper 180 has two footboards, each of which has an approximately foot shape and has a size sufficient to support the entire sole of the foot of the user, such that the user can comfortably place his/her feet on the pedal plates to exercise. Preferably, each footboard has an uneven surface to prevent the user's feet from slipping.

The stepper 180 and the hydraulic cylinders 190 are mounted to the main frame 110 through the first and second subsidiary frames 171 and 175. The first subsidiary frame 171 is positioned above the second subsidiary frame 175. The second subsidiary frame 175 is coupled to a handlebar frame 117 through a front frame 113, which has a triangular shape in consideration of the steering ability and stability of the fitness machine.

The detailed constructions and operation of well-known components, such as the battery, the electromotor 160 and the brake system (not shown), will be omitted.

As shown in FIG. 3, a hydraulic pressure sensor 195 is connected to the hydraulic cylinders 190 to detect variation in pressure of the hydraulic cylinders 190 and a rate of pressure variation according to the operation of the stepper 180. The hydraulic pressure sensor 195 detects information about pressure variation of the hydraulic cylinders 190 and generates a signal indicative of the sensing results. Furthermore, each hydraulic cylinder 190 includes a pressure control valve 193 which adjusts hydraulic pressure of the hydraulic cylinder 190 such that the user can appropriately adjust hydraulic pressure depending on his/her age, sex and weight. Furthermore, the present invention includes the controller 200 which determines pressure variation of the hydraulic cylinders 190 and a rate of pressure variation thereof using sensing signals transmitted from the hydraulic pressure sensor 195 and, thus, controls operation of the electromotor 160 to determine movement of the fitness machine and controls the number of revolutions of the electromotor 160 to control moving speed the fitness machine.

Of course, in order to allow the controller 200 to control operation of the electromotor 160 and the number of revolutions thereof depending on variations in hydraulic pressure of the hydraulic cylinder 190, the fitness machine must be set by the user into the fitness mode. In other words, only when the fitness mode switch 143 is turned on can the number of revolutions of the electromotor 160 be controlled depending on a vertical movement speed of the stepper 180.

Figure 4:
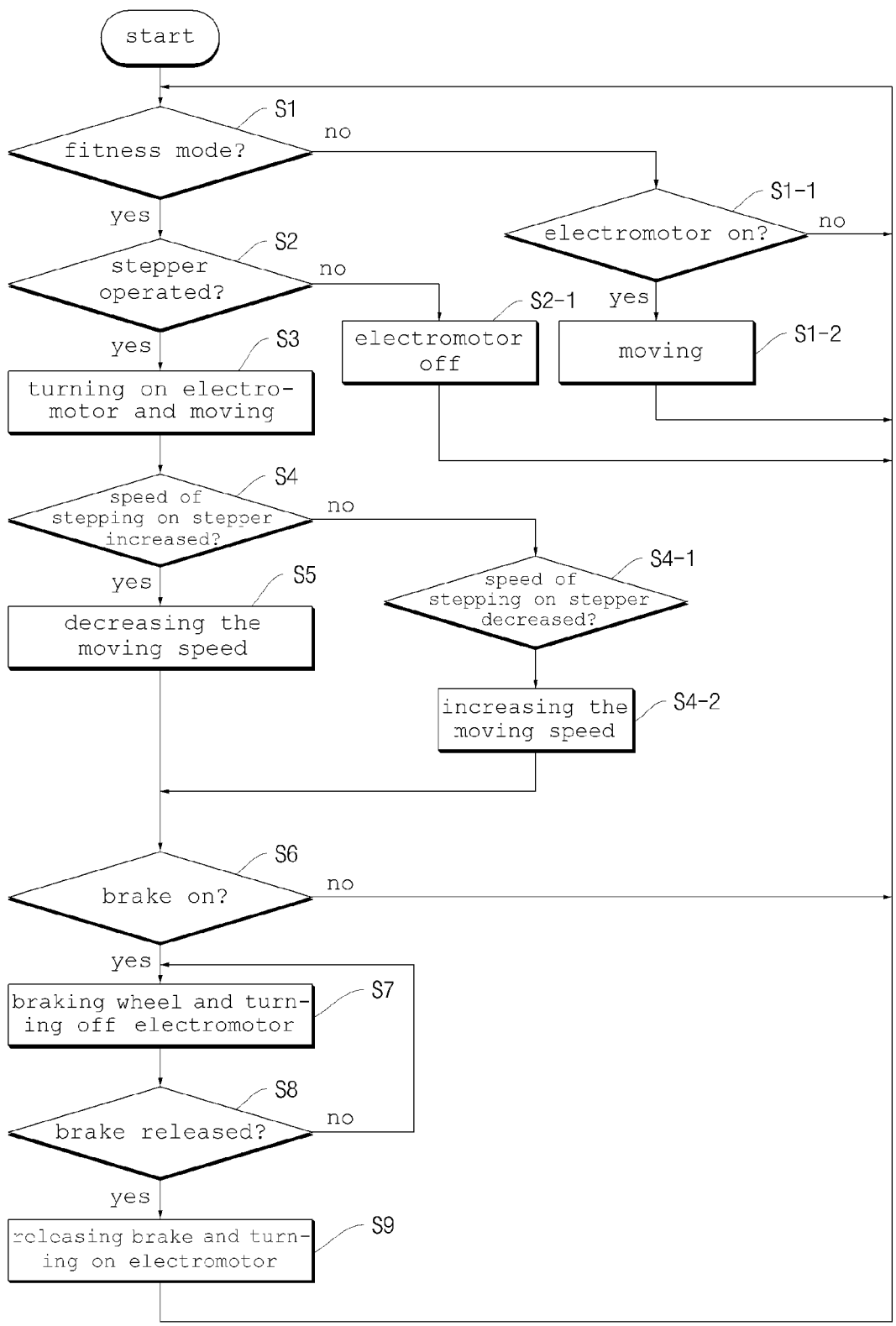
FIG. 4 is a flowchart of the operation of the mobile fitness machine having the stepper according to the embodiment of the present invention.

FIG. 4 is a flowchart of the operation of the mobile fitness machine having the stepper according to the embodiment of the present invention. This drawing will be explained herein below with reference to FIGS. 1 and 3.

First, in an initializing process, the controller 200 refers to a mode set by the user, and thus determines whether the fitness mode switch 143 is set to a fitness mode, at step S1.

If the fitness machine is not set to the fitness mode, the electromotor 160 and the stepper 180 are separately operated. That is, the electromotor 160 is operated under the control of the user who manipulates the driving control panel 141, and thereby the fitness machine is moved, at steps S1-1 and S1-2. Separately, the user may exercise using the stepper 180 while the fitness machine is in motion. As such, when the fitness machine is not set to the fitness mode, the fitness machine is like an electric scooter, to which the stepper 180 is merely mechanically coupled.

However, at step S1, if the fitness machine is set to the fitness mode, the controller 200 determines whether hydraulic pressure is varied using the hydraulic pressure sensor 195, at step S2. In other words, the controller 200 determines whether the stepper 180 is being operated by determining if the hydraulic pressure of the hydraulic pressure cylinders 190 is varied. If the hydraulic pressure of the hydraulic pressure cylinders 190 is varied, the controller 200 supplies power from the battery to the electromotor 160 to operate it, at step S3. As such, by the operation of the electromotor 160, the drive wheels are rotated. Thereby, the fitness machine is moved.

Of course, in the state in which the fitness machine is set to the fitness mode, if there is no variation in the hydraulic pressure of the hydraulic pressure cylinders 190, that is, if the user does not use the stepper 180, power is not applied to the electromotor 160 regardless of manipulation of the driving control panel 141, at step S2-1.

As such, when hydraulic pressure of the hydraulic pressure cylinders 190 is varied by operation of the stepper 180, the electromotor 160 is operated depending on variation of the hydraulic pressure. If the user steps on the stepper 180 more rapidly, a rate of variation in the hydraulic pressure is increased. At this time, the hydraulic pressure sensor 195 detects the rate of pressure variation and transmits a signal to the controller 200. Then, the controller 200, which receives the signal corresponding to the rate of pressure variation, calculates a stepping speed of the stepper 180 and outputs a pulse width modulation (PWM) control signal, corresponding to the stepping speed, to the electromotor 160, thus controlling the number of revolutions of the electromotor 160, thereby controlling the speed of the fitness machine when in motion.

That is, in the above state, if the user steps the stepper 180 more rapidly, a rate of variation in hydraulic pressure of the hydraulic cylinders 180 is increased. The controller 200 detects the rate of pressure variation using the hydraulic pressure sensor 195, at step S4. At step S5, the controller 200 outputs a corresponding pulse width modulation control signal, thus increasing the number of revolutions of the electromotor 160 to increase the speed of the fitness machine when in motion. In contrast, if the rate of pressure variation of the stepper 180 decreases, the controller 200 reduces the number of revolutions of the electromotor 160 such that the speed of the fitness machine is reduced, at steps S4-1 and S4-2.

Thereafter, at steps S6 and S7, if a brake lever 145 provided on the handlebars 140 is operated, the fitness machine is stopped by physically braking the front wheel 120 or the rear wheels 130, and, simultaneously, the controller 200 interrupts power, which has been applied to the electromotor 160, to reduce load and consumption power of the electromotor 160. Subsequently, if the brake lever 145 is released, the drive wheels, which have been stopped by the brake, are released and, simultaneously, supply of power to the electromotor 160 is resumed, at steps S8 and S9.

Although the preferred embodiment of the present invention has been disclosed for illustrative purpose, a stationary fitness bicycle, which has pedals using a principle of magnetic resistance, may be applied to the present invention.

The stationary fitness bicycle includes a rotating plate which is coupled to the pedals and provided in the main body at a position adjacent to a separate magnet. When the rotating plate is rotated by rotation of the pedals, resistance force generated by magnetic force of the magnet is applied to the rotating plate. The detailed construction of the stationary fitness bicycle is well-known in the art, therefore further explanation is deemed unnecessary.

Furthermore, the operation of a fitness machine having the stationary fitness bicycle is the same as that of the fitness machine having the stepper, as shown in FIG. 4. However, unlike the fitness machine having the stepper with the hydraulic pressure sensor, an optical sensor or a microswitch is used for sensing both whether the pedals are rotated and the number of revolutions of the pedals.

Furthermore, it will be easily appreciated that the external construction of the fitness machine may be variously modified, for example, having a two-wheel structure or four-wheel structure but not having the three-wheel structure, or using the front wheel as the drive wheel.

As well, the hydraulic cylinder and the hydraulic pressure sensor may be replaced with substitutions, such as a pneumatic cylinder and a pneumatic pressure sensor.

These modified embodiments must be regarded as falling within the bounds of the accompanying clams, but not departing from the scope and spirit of the invention.

INDUSTRIAL APPLICABILITY

As described above, the present invention provides a mobile fitness machine which is manufactured by combining a fitness device, such as a stepper or stationary fitness bicycle, which are kinds of indoor exercising devices, with a device which is used as a means for moving outdoors, thus making it possible for a user to conduct exercise that has been executed mainly indoors, outdoors, while in motion. Furthermore, when the mobile fitness machine is set to a fitness mode, the mobile fitness machine travels by operation of the stepper or the fitness bicycle. According to a speed at which it is operated, moving speed of the fitness machine is changed. Therefore, the present invention has an advantage of attracting interest in exercise.

As well, because it is possible to exercise while in motion, the interest of the user is aroused and various exercising effects are induced, unlike a typical simple bicycle or electric scooter. As such, because exercise, traveling and a diversion are possible at the same time, the present invention can further enhance effects of the exercise.

In addition, the fitness machine of the present invention can be used outdoors. Accordingly, all members of the family can enjoy playing and exercising together, unlike the conventional arts in which the user individually had exercise. Thus, the present invention has an advantage of improvement in family relationships.

The invention claimed is:

1. An outdoor mobile fitness machine, comprising: a main frame, to which a front wheel that is a steerable wheel, a rear wheel that is a drive wheel, and a set of handlebars are mounted, the outdoor mobile fitness machine being moved by rotation of the drive wheel which is rotated by an electromotor, the outdoor mobile fitness machine further comprising:
a fitness device provided at an intermediate position on the main frame and operated by feet of a user, the fitness device providing a load, which is a physical resistance against the movement of the feet of the user;
a sensor to determine whether the fitness device is in operation and detect an operating speed of the fitness device; and
a controller to determine whether the fitness device is in operation and an operating speed of the fitness device in response to a fitness device information signal transmitted from the sensor and to output a control signal to variably control an electric current to be applied to the electromotor, thus automatically controlling motion and moving speed of the fitness machine.

2. The outdoor mobile fitness machine according to claim 1, wherein the fitness device comprises a stepper providing a load using a hydraulic cylinder or a pneumatic cylinder.

3. The outdoor mobile fitness machine according to claim 1, wherein the fitness device comprises a stationary fitness bicycle providing a load using magnetic resistance.

4. An outdoor mobile fitness machine, comprising: a main frame, to which a front wheel that is a steerable wheel, a rear wheel that is a drive wheel, and a set of handlebars are mounted, the outdoor mobile fitness machine being moved by rotation of the drive wheel which is rotated by an electromotor, the outdoor mobile fitness machine further comprising:
a stepper hinged at an end thereof to a first subsidiary frame coupled to an intermediate position of the main frame and allowing a user to execute an alternately upward and downward stepping exercise using his/her feet;
a hydraulic cylinder hinged both to a lower end of the stepper and to a second subsidiary frame coupled to the main frame and operated by upward and downward movement of the stepper, thus providing a load to the user;
a hydraulic pressure sensor to detect both variation in pressure of the hydraulic cylinder and a rate of pressure variation and to output a signal; and
a controller to determine both the pressure variation and the rate of pressure variation in response to the signal output from the hydraulic pressure sensor and to control operation and revolutions of the electromotor, thus variably controlling motion and moving speed of the fitness machine.

5. The outdoor mobile fitness machine according to claim 1 or 4, further comprising:
a wheel locking unit mounted to the rear wheel, so that the fitness device is operated at a stationary position.

6. The outdoor mobile fitness machine according to claim 4, further comprising:
a fitness mode switch provided on the handlebars to input a command signal to control the operation and the revolutions of the electromotor according to the pressure variation of the hydraulic cylinder.

7. The outdoor mobile fitness machine according to claim 6, wherein, when the fitness mode switch is manipulated to select a fitness mode, the controller variably controls the revolutions of the electromotor depending on an upward and downward movement speed of the stepper.

8. A control method of an outdoor mobile fitness machine having a fitness device, comprising steps of:
determining whether an operating mode selected by a user is a fitness mode; determining whether the fitness device is in operation using a sensor when the fitness mode is selected;
operating an electromotor to rotate a drive wheel of the fitness machine when the fitness device is in operation;
determining whether an operating speed of the fitness device is varied while the drive wheel is rotated; and
proportionally controlling revolutions of the electromotor depending on the operating speed of the fitness device when the operating speed is varied, thus controlling a moving speed of the fitness machine.

9. A control method of an outdoor mobile fitness machine having a fitness device, comprising:
a first step of determining whether an operating mode selected by a user is a fitness mode;

a second step of determining whether pressure of a hydraulic cylinder coupled to a stepper is varied using a hydraulic pressure sensor when the fitness mode is selected;

a third step of operating an electromotor to rotate a drive wheel when pressure variation is detected;

a fourth step of determining whether a rate of pressure variation of the hydraulic cylinder is varied depending on a speed of stepping on the stepper while the drive wheel is rotated; and a fifth step of proportionally controlling revolutions of the electromotor depending on the rate of pressure variation when the rate of pressure variation is varied, thus controlling a moving speed of the fitness machine.

10. The control method of the outdoor mobile fitness machine according to claim 9, wherein, at the first step, when the fitness mode is not selected, operation of the electromotor, which rotates the drive wheel, is controlled depending on an operating mode of a driving control panel located on handlebars.

11. The control method of the outdoor mobile fitness machine according to claim 9, wherein, at the second step, when pressure of the hydraulic cylinder coupled to the stepper is constant, the electromotor is turned off.

12. The control method of the outdoor mobile fitness machine according to claim 9, wherein, at the fourth step, when the rate of pressure variation increases, the revolutions of the electromotor are increased, and, when the rate of pressure variation decreases, the revolutions of the electromotor are reduced.

13. The control method of the outdoor mobile fitness machine according to claim 9, wherein, when a brake is operated while the fitness machine is in motion, the drive wheel is stopped and the electromotor is turned off, and, when the brake is released, the operation of the electromotor is resumed.

* * * * *